(12) United States Patent
Dobashi

(10) Patent No.: US 11,473,620 B2
(45) Date of Patent: Oct. 18, 2022

(54) ROLLING BEARING PRECOMPRESSION METHOD, BEARING PRECOMPRESSION DEVICE, BEARING ASSEMBLY, MACHINE, AND VEHICLE

(71) Applicant: NSK LTD., Tokyo (JP)

(72) Inventor: Kouhei Dobashi, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/260,301

(22) PCT Filed: May 20, 2019

(86) PCT No.: PCT/JP2019/019934
§ 371 (c)(1),
(2) Date: Jan. 14, 2021

(87) PCT Pub. No.: WO2020/039668
PCT Pub. Date: Feb. 27, 2020

(65) Prior Publication Data
US 2021/0277940 A1    Sep. 9, 2021

(30) Foreign Application Priority Data

Aug. 23, 2018    (JP) .............................. JP2018-156223

(51) Int. Cl.
*F16C 25/06*    (2006.01)
*F16C 35/073*    (2006.01)
(Continued)

(52) U.S. Cl.
CPC .............. *F16C 25/06* (2013.01); *F16C 19/54* (2013.01); *F16C 25/08* (2013.01); *F16C 35/073* (2013.01); *F16C 35/077* (2013.01)

(58) Field of Classification Search
CPC .......... F16C 25/06; F16C 25/08; F16C 35/07; F16C 35/073; F16C 35/077; F16C 2226/16; F16C 2229/00
See application file for complete search history.

(56) References Cited

U.S. PATENT DOCUMENTS 3,807,820 A    4/1974  Schuhmann
3,816,013 A *  6/1974  Schuhmann .............. F16B 3/06
                                                    403/368

(Continued)

FOREIGN PATENT DOCUMENTS

DE          479836 C       7/1929
DE          55 482 A1      4/1967
(Continued)

OTHER PUBLICATIONS

Translation of JP11264421 obtained Jan. 4, 2022.*
(Continued)

*Primary Examiner* — James Pilkington
(74) *Attorney, Agent, or Firm* — Sughrue Mion, PLLC

(57) ABSTRACT

In a housing that supports a rotating shaft via a rolling bearing which is subjected to predetermined position precompression, a wedge member, the radial thickness of which increases from the leading end towards the base end thereof, is inserted between the housing and the outer circumferential surface of the outer race of the rolling bearing and between the rotating shaft and the inner circumferential surface of an inner race of the rolling bearing, the wedge member being inserted from the leading end thereof along the radial direction of the rotating shaft. The wedge member is fixed by being fastened, ahead in the insertion direction, by bolts and nuts, so that precompression force along with predetermined position precompression is imparted to the rolling bearing.

20 Claims, 9 Drawing Sheets

(51) Int. Cl.
*F16C 35/077* (2006.01)
*F16C 19/54* (2006.01)
*F16C 25/08* (2006.01)

(56) References Cited

U.S. PATENT DOCUMENTS

| | | | | |
|---|---|---|---|---|
| 4,587,715 | A | 5/1986 | Hallerback | |
| 4,677,725 | A | 7/1987 | Hallerback | |
| 4,893,948 | A * | 1/1990 | Hoch | F16C 19/28 384/538 |
| 6,893,160 | B2 * | 5/2005 | Casey | F16C 35/073 384/538 |
| 8,591,059 | B2 * | 11/2013 | Casey | F16B 31/02 362/234 |
| 8,801,293 | B2 * | 8/2014 | Wendeberg | F16C 35/073 384/538 |
| 2012/0237152 | A1 | 9/2012 | Wheals | |
| 2017/0159704 | A1 | 6/2017 | Wheals | |

FOREIGN PATENT DOCUMENTS

| | | | |
|---|---|---|---|
| DE | 102005032529 | * | 1/2007 |
| DE | 102009005109 | * | 7/2010 |
| DE | 102015212183 | * | 12/2016 |
| FR | 632036 A | | 12/1927 |
| GB | 459 265 A | | 1/1937 |
| JP | S50-004443 A | | 1/1975 |
| JP | S53-041637 Y | | 10/1978 |
| JP | S56-169760 A | | 12/1981 |
| JP | S59-169735 A | | 9/1984 |
| JP | 64-29536 U | | 2/1989 |
| JP | H05-164127 A | | 6/1993 |
| JP | H11-264421 A | | 9/1999 |
| JP | 2002-235740 A | | 8/2002 |
| JP | 2002-340004 A | | 11/2002 |
| JP | 2007-107576 A | | 4/2007 |
| JP | 2009-248291 A | | 10/2009 |
| JP | 2013-504727 A | | 2/2013 |
| JP | 2013-141861 A | | 7/2013 |
| JP | 2016-084894 A | | 5/2016 |
| WO | 2008/042577 A2 | | 4/2008 |

OTHER PUBLICATIONS

Translation of JP2016084894 obtained Jan. 4, 2022.*
Communication dated Sep. 7, 2021, from the European Patent Office in European Application No. 19851181.8.
Written Opinion (PCT/ISA/237) issued by the International Searching Authority in corresponding International Application No. PCT/JP2019/019934, dated Aug. 13, 2019.
International Search Report (PCT/ISA/210), issued by International Searching Authority in corresponding International Application No. PCT/JP2019/019934, dated Aug. 13, 2019.
Communication dated Dec. 3, 2019, from the Japanese Patent Office in counterpart application No. 2019-555054.

* cited by examiner

ROLLING BEARING PRECOMPRESSION METHOD, BEARING PRECOMPRESSION DEVICE, BEARING ASSEMBLY, MACHINE, AND VEHICLE

CROSS-REFERENCE TO RELATED APPLICATIONS

This application is a National Stage of International Application No. PCT/JP2019/019934 filed on May 20, 2019, claiming priority based on Japanese patent application No. 2018-156223 filed on Aug. 23, 2018, the contents of which are incorporated herein by reference.

TECHNICAL FIELD

The present invention relates to a rolling bearing preloading method, a bearing preload device, a bearing assembly, a machine equipped with the bearing assembly, and a vehicle.

BACKGROUND ART

In a rotating machine using rolling bearings, as illustrated in FIGS. 6 and 7, a rotating shaft 101 may be supported by a housing 103 via a pair of rolling bearings 105 separated in an axial direction. Here, in order to reduce the displacement when a load is applied, a preload is applied to the rolling bearing 105 to exert the required rigidity. There are two types of preload application: constant pressure preloading which applies a preload to the rolling bearing 105 by a spring 107 as illustrated in FIG. 6, and a fixed position preloading which applies a preload load by giving a dimensional difference between inner rings 113 and outer rings 115 of the rolling bearings 105 by spacers 109 and 111 as illustrated in FIG. 7.

In general, the fixed position preloading is more likely to obtain higher rigidity than the constant pressure preloading. However, in the fixed position preloading, the amount of preload can be changed by the influence of a dimensional change of the rotating shaft 101 and the housing 103 due to thermal expansion, and thus there is a concern that problems such as excessive preload and loss of preload may occur under harsh operating conditions.

In order to avoid such a problem of change in the amount of preload in the fixed position preloading, a technique has been proposed in which a preload adjustment ring having a coefficient of thermal expansion different from that of an inner ring spacer is provided between a pair of inner ring spacers arranged axially apart to cancel the change in the preload amount due to a temperature change (JP 2002-235740 A (Patent Literature 1)).

Another technique has been proposed in which the rigidity of a spindle can be maintained and changed by preloading a rolling bearing using a hydraulic mechanism in addition to a spacer (JP H05-164127 A (Patent Literature 2)).

Still another technique for adjusting the preload amount by temporarily moving a bearing into which a rotating shaft is press-fitted in an axial direction by using a hydraulic mechanism has also been proposed (JP 2002-340004 A (Patent Literature 3)).

[Patent Literature 1]: JP 2002-235740 A
[Patent Literature 2]: JP H05-164127 A
[Patent Literature 3]: JP 2002-340004 A
[Patent Literature 4]: JP H11-264421 A
[Patent Literature 5]: JP 2013-504727 A However, the technique of Patent Literature 1 uses a spacer having a special structure which includes two inner ring spacers and a preload adjusting ring provided between the inner ring spacers. Therefore, the number of parts increases and the structure of rolling bearings becomes complicated due to the use of special parts. As a result, there are problems such as an increase in the manufacturing cost of the rolling bearing and a decrease in maintainability.

Since the techniques of Patent Literature 2 and Patent Literature 3 use a complicated hydraulic mechanism, there is a problem that the mechanism of the rolling bearing becomes large and the structure becomes complicated.

As a method of preventing a relative movement of the inner ring and shaft of a rolling bearing and the outer ring and housing by a method other than press fitting, there is a method of using the preload itself as illustrated in FIG. 8. Such method is often used when used at a relatively light load and low speed rotation. In an example illustrated in FIG. 8, a fixed position preload spacer 117 on the inner ring 113 side whose axial dimension is adjusted to be shorter by the preload with respect to an axial distance between the pair of outer rings 115 determined by the housing 103 is prepared, the fixed position preload spacer 117 is interposed between the pair of inner rings 113, and then the inner ring 113 is tightened by a bearing nut 119. Such method has a simple mechanism, but especially in the outer ring 115, the fixing strength against backlash in a radial direction (diameter direction) is weak. When the preload is released due to a difference in the amount of expansion due to the temperature change or the axial load, the fixing effect of the outer ring 115 is lost, which causes the accuracy of the rolling bearing to deviate and creep to occur. In the inner ring 113, since the position is held by the friction caused by an axial force, the inner ring 113 may move (shift) in the radial direction by the amount of the gap between the rotating shaft 101 and the inner ring 113 due to an impact load or the like.

As a method of compensating for the difficulty of fixing the outer ring as described above, as illustrated in FIG. 9, there is a method in which a mechanism 121 for pressing the outer ring 115 is added and the outer ring is fixed by a tightening force similar to that of the inner ring 113. Here, the occurrence of slippage and creep can be prevented as compared with the fixing by the preload. However, when a thin-walled bearing is used, it is difficult to apply a sufficient axial tightening force, and it may not be possible to secure sufficient resistance to displacement against an input of an external force. When the bearing 105 is replaced or the rigidity of a spindle is adjusted, it is necessary to disassemble each part and rework the fixed position preload spacer 117.

It is known that a wedge-shaped member is inserted between a rotating shaft and a bearing or between a housing and the bearing as a method of applying a preload or a radial force to a rolling bearing provided between the shaft and the housing (see JP H11-264421 A (Patent Literature 4) and JP 2013-504727 A (Patent Literature 5)).

However, the techniques of Patent Literatures 4 and 5 have a configuration in which a desired preload or radial force is applied or not applied at all by inserting a wedge member and the adjustment function to increase or decrease the preload is not obtained.

SUMMARY OF INVENTION

An object of the invention is to provide a rolling bearing preloading method, a bearing preload device, a bearing assembly, a machine equipped with the bearing assembly, and a vehicle, which can apply an appropriate fixed position preload without increasing the size of a bearing mechanism and impairing maintainability.

The invention has the following configuration.

(1) A method for preloading a rolling bearing of a housing which supports a rotating shaft via the rolling bearing which is subjected to fixed position preloading, the method including:

inserting a wedge member, whose radial thickness gradually increases from a tip end portion to a base end portion, from the tip end portion of the wedge member along an axial direction of the rotating shaft into at least one of between an outer peripheral surface of an outer ring of the rolling bearing and the housing and between an inner peripheral surface of an inner ring of the rolling bearing and the rotating shaft; and applying a preload to the rolling bearing together with a fixed position preload by tightening and fixing the wedge member in an insertion direction by a tightening member.

According to the rolling bearing preloading method, in addition to a configuration in which normal fixed position preloading is performed, at least one of the outer ring and the inner ring of the bearing can be directly and firmly fixed to at least one of the housing and the rotating shaft by the wedge effect of the wedge member. As a result, an appropriate fixed position preload can be applied to the rolling bearing without increasing the size of the bearing mechanism and without impairing maintainability.

(2) The rolling bearing preloading method according to (1) which includes inserting the wedge member along an inclined inner peripheral surface formed in a region of the housing facing the outer peripheral surface of the outer ring.

According to the rolling bearing preloading method, the outer ring of the bearing can be directly and firmly fixed to the housing by the wedge effect of the wedge member in addition to a configuration in which normal fixed position preloading is performed. Therefore, an appropriate fixed position preload can be applied to the rolling bearing without increasing the size of the bearing mechanism and without impairing maintainability.

(3) The rolling bearing preloading method according to (1) or (2) which includes inserting the wedge member along an inclined outer peripheral surface formed in a region of the rotating shaft facing the inner peripheral surface of the inner ring.

According to the rolling bearing preloading method, the inner ring of the bearing can be directly and firmly fixed to the rotating shaft by the wedge effect of the wedge member in addition to a configuration in which normal fixed position preloading is performed. Therefore, an appropriate fixed position preload can be applied to the rolling bearing without increasing the size of the bearing mechanism and without impairing maintainability.

(4) A method for preloading a rolling bearing of a housing which supports a rotating shaft via the rolling bearing which is subjected to fixed position preloading, the method including;

arranging a wedge member including a pair of wedge pieces in at least one of between an outer peripheral surface of an outer ring of the rolling bearing and the housing and between an inner peripheral surface of an inner ring of the rolling bearing and the rotating shaft, each of the pair of wedge pieces being provided with an inclined engaging surface inclined from an insertion direction and gradually increasing in radial thickness from a tip end portion to a base end portion;

inserting one of the pair of wedge pieces from the tip end portion along an axial direction of the rotating shaft, making the one abut on the rolling bearing at a peripheral surface opposite from the inclined engaging surface, and making another of the pair of wedge pieces abut on a mating member facing the rolling bearing at a peripheral surface opposite from the inclined engaging surface, and applying a preload to the rolling bearing together with a fixed position preload by tightening and fixing one of the wedge pieces in the insertion direction by a tightening member.

According to the rolling bearing preloading method, the wedge effect is exhibited by the wedge member itself including the pair of wedge pieces. Therefore, it is not necessary to separately perform processing for obtaining the wedge effect on the housing and the rotating shaft, and thus the bearing assembly can be realized at a relatively low cost.

(5) The rolling bearing preloading method according to any one of (1) to (4) in which the wedge member is an annular member in which an inclined surface inclined from the insertion direction of the wedge member is formed along a circumferential direction.

According to the rolling bearing preloading method, the wedge effect of the wedge member can be exerted over the entire circumference of the bearing.

(6) A bearing preload device of a housing which supports a rotating shaft via a rolling bearing which is subjected to fixed position preloading, the bearing preload device including; a wedge member inserted along an axial direction of the rotating shaft into at least one of between an outer peripheral surface of an outer ring of the rolling bearing and the housing and between an inner peripheral surface of an inner ring of the rolling bearing and the rotating shaft and gradually increasing in radial thickness from a tip end portion to a base end portion, and a tightening member configured to apply a preload to the rolling bearing together with a fixed position preload by tightening and fixing the wedge member in an insertion direction.

According to the bearing preload device, in addition to a configuration in which normal fixed position preloading is performed, at least one of the outer ring and the inner ring of the bearing can be directly and firmly fixed to at least one of the housing and the rotating shaft by the wedge effect of the wedge member. As a result, an appropriate fixed position preload can be applied to the rolling bearing without increasing the size of the bearing mechanism and without impairing maintainability.

(7) The bearing preload device according to (6) in which the wedge member is inserted along an inclined inner peripheral surface formed in a region of the housing facing the outer peripheral surface of the outer ring.

According to the bearing preload device, the outer ring of the bearing can be directly and firmly fixed to the housing by the wedge effect of the wedge member in addition to a configuration in which normal fixed position preloading is performed. Therefore, an appropriate fixed position preload can be applied to the rolling bearing without increasing the size of the bearing mechanism and without impairing maintainability.

(8) The bearing preload device according to (6) or (7) in which the wedge member is inserted along an inclined outer peripheral surface formed in a region of the rotating shaft facing the inner peripheral surface of the inner ring.

According to the bearing preload device, the inner ring of the bearing can be directly and firmly fixed to the rotating shaft by the wedge effect of the wedge member in addition to a configuration in which normal fixed position preloading is performed. Therefore, an appropriate fixed position preload can be applied to the rolling bearing without increasing the size of the bearing mechanism and without impairing maintainability.

(9) A bearing preload device of a housing which supports a rotating shaft via a rolling bearing which is subjected to fixed position preloading, the bearing preload device including;

a wedge member inserted into at least one of between an outer peripheral surface of an outer ring of the rolling bearing and the housing and between an inner peripheral surface of an inner ring of the rolling bearing and the rotating shaft and including a pair of wedge pieces, each of the pair of wedge pieces being provided with an inclined engaging surface inclined from an insertion direction gradually increasing in radial thickness from a tip end portion to a base end portion; and a tightening member configured to apply a preload to the rolling bearing together with a fixed position preload by tightening and fixing one of the pair of wedge pieces of the wedge member in the insertion direction, making the one abut on the rolling bearing at a peripheral surface opposite from the inclined engaging surface, and making another of the pair of wedge pieces abut on a mating member facing the rolling bearing at a peripheral surface opposite from the inclined engaging surface.

According to the bearing preload device, the wedge effect is exhibited by the wedge member itself including the pair of wedge pieces. Therefore, it is not necessary to separately perform processing for obtaining the wedge effect on the housing and the rotating shaft, and thus the bearing assembly can be realized at a relatively low cost.

(10) The bearing preload device according to any one of (6) to (9) in which the wedge member is an annular member in which an inclined surface inclined from the insertion direction of the wedge member is formed along a circumferential direction.

According to the bearing preload device, the wedge effect of the wedge member can be exerted over the entire circumference of the bearing.

(11) A bearing assembly which includes a rolling bearing including an inner ring, an outer ring, and a plurality of rolling elements arranged between the outer ring and the inner ring, and the bearing preload device according to any one of (6) to (10).

According to the bearing assembly, the outer ring of the bearing can be directly and firmly fixed to the housing by the wedge effect of the wedge member in addition to a configuration in which normal fixed position preloading is performed. Therefore, an appropriate fixed position preload can be applied to the rolling bearing without increasing the size of the bearing mechanism and without impairing maintainability.

(12) A machine which includes the bearing assembly according to (11).

According to the machine, it is possible to realize a machine equipped with a bearing assembly which applies an appropriate fixed position preload to the rolling bearing without increasing the size of the bearing mechanism and impairing maintainability.

(13) A vehicle which includes the bearing assembly according to (11).

According to the vehicle, it is possible to realize a vehicle equipped with a bearing assembly which applies an appropriate fixed position preload to the rolling bearing without increasing the size of the bearing mechanism and impairing maintainability.

According to the invention, appropriate fixed position preload can be applied to a rolling bearing without increasing the size of a bearing mechanism and without impairing maintainability.

DESCRIPTION OF EMBODIMENTS

Hereinafter, embodiments of the invention will be described in detail with reference to the drawings.

First Embodiment

Figure 1:
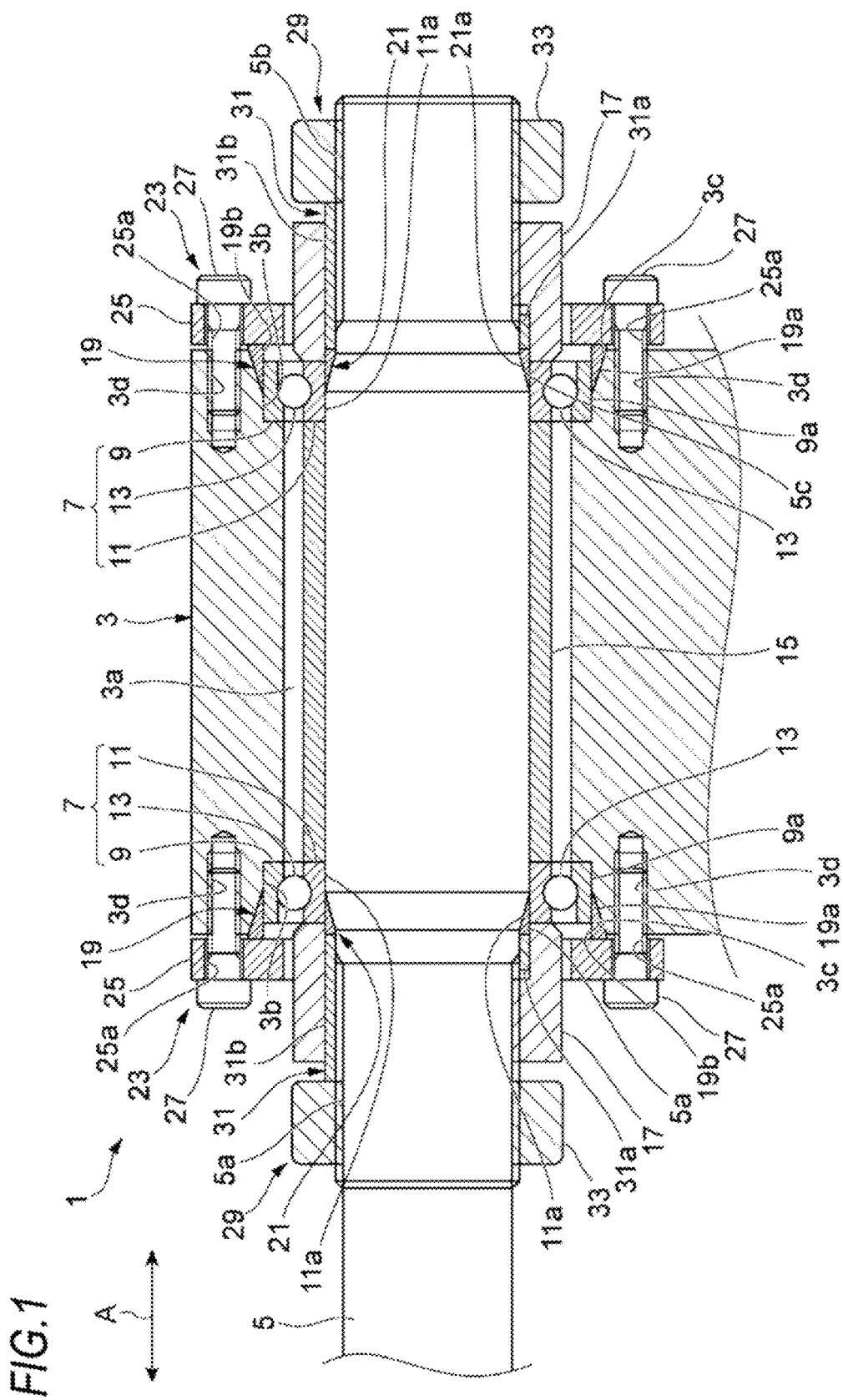
FIG. 1 is a cross-sectional view of a bearing assembly according to a first embodiment of the invention.
Figure 2:
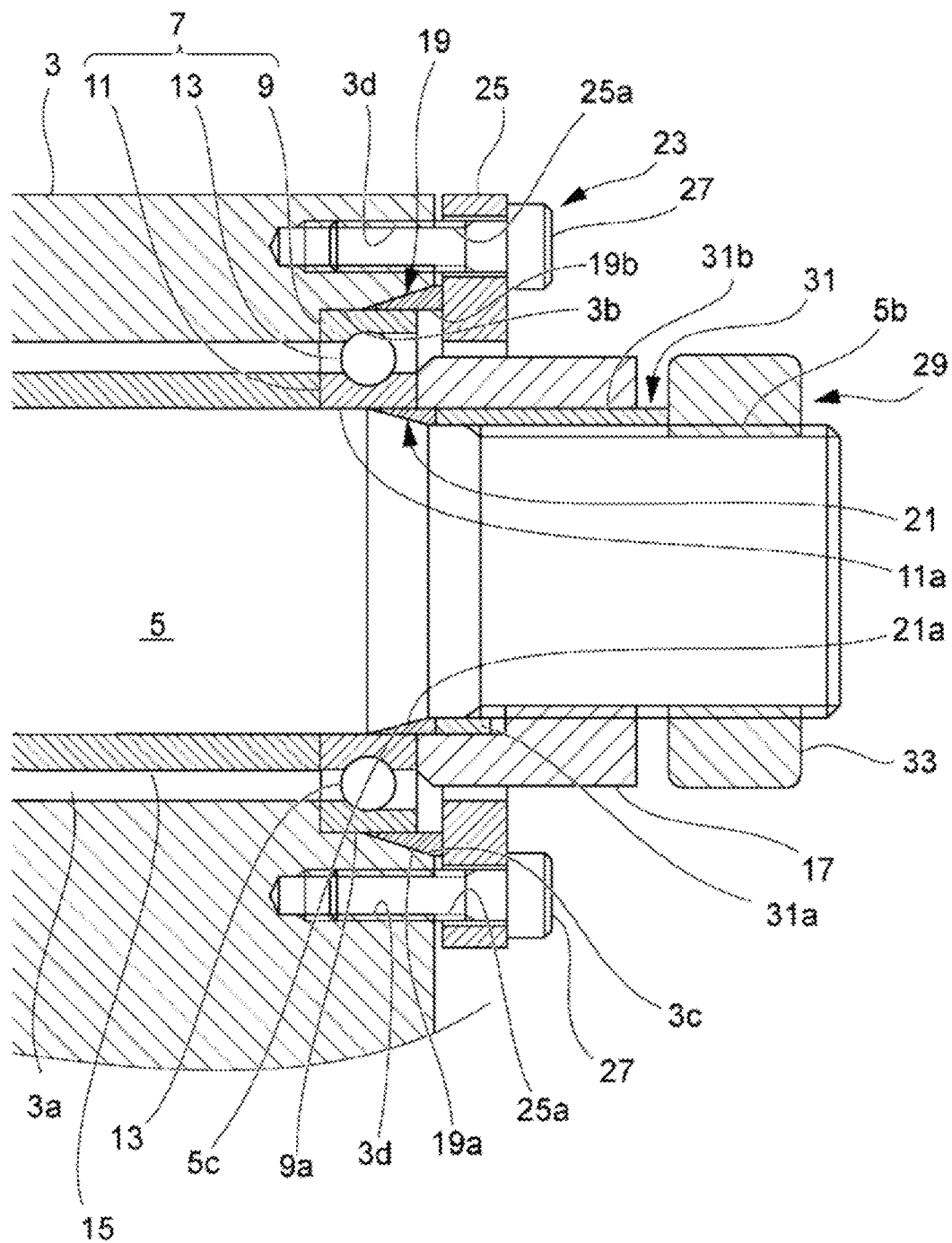
FIG. 2 is a partially enlarged view of FIG. 1.

FIG. 1 is a cross-sectional view of a bearing assembly according to a first embodiment of the invention and FIG. 2 is a partially enlarged view of FIG. 1. FIGS. 1 and 2 also illustrate a preloading method according to an embodiment of the invention.

As illustrated in FIGS. 1 and 2, a bearing assembly 1 includes a housing 3, a rotating shaft 5, and a pair of rolling bearings 7 (hereinafter, simply referred to as "bearings"). The housing 3 supports the rotating shaft 5 via the pair of bearings 7 provided apart in an axial direction (direction indicated by an arrow A). Each bearing 7 includes an outer ring 9 fixed to the housing 3, an inner ring 11 fixed to the rotating shaft 5, and a plurality of rolling elements 13 arranged between the outer ring 9 and the inner ring 11 and rolling.

A shaft hole 3a is formed in the housing 3 along the axial direction and notches 3b into which the outer rings 9 of the bearings 7 are fitted are provided at both ends of the shaft hole 3a in the axial direction. An axial distance between the pair of outer rings 9 is kept equal to an axial distance between the pair of notches 3b.

On the other hand, between the pair of inner rings 11, a spacer 15 whose size is selected (or formed) shorter than the distance between the steps of the notches 3b by the preload is provided. The spacer 15 is a tubular member of which the rotating shaft 5 is inserted into an inner peripheral portion. On the rotating shaft 5, male screw portions 5a and 5b are formed in the vicinities of the axial positions where both ends of the housing 3 are arranged. Preload nuts 17 are respectively attached to the male screw portions 5a and 5b. Respective inner rings 11 are tightened from both sides in the axial direction by the preload nuts 17 in a state where the spacer 15 is interposed therebetween. As a result, the required preload is applied to each bearing 7.

Each of the pair of outer rings 9 is provided with an outer wedge member 19 between an outer peripheral surface 9a and the housing 3. As illustrated in FIG. 2, the outer wedge member 19 is inserted along an inclined inner peripheral surface 3c formed in a region of the housing 3 facing the outer peripheral surface 9a of the outer ring 9. The outer wedge member 19 is an annular member having an inclined surface 19a whose radial thickness gradually increases from the tip end portion in an insertion direction toward a base end portion. The inclined surface 19a and the inclined inner peripheral surface 3c of the housing 3 are in contact with each other and a surface 19b opposite from the inclined surface 19a and the outer ring 9 are in contact with each other.

Inner wedge members 21 are respectively provided between the inner peripheral surfaces 11a of the pair of inner rings 11 and the rotating shaft 5. The inner wedge member 21 is inserted along an inclined outer peripheral surface 5c formed in a region of the rotating shaft 5 facing the inner peripheral surface 11a of the inner ring 11. The inner wedge member 21 is an annular member having an inclined surface 21a whose radial thickness gradually increases from the tip end portion in the insertion direction toward the base end portion. The inclined surface 21a and the inclined outer peripheral surface 5c are in contact with each other.

The pair of outer wedge members 19 are respectively tightened in the insertion direction by first tightening mechanisms 23 and are fixed between the outer ring 9 and the housing 3. The pair of inner wedge members 21 are respectively tightened in the insertion direction by second tightening mechanisms 29 and are fixed between the inner ring 11 and the rotating shaft 5. The first tightening mechanism 23 and the second tightening mechanism 29 form a bearing preload device which uses the bearing preloading method according to the embodiment of the invention.

The first tightening mechanism 23 includes a first pushing member 25 which is in contact with the base end of the outer wedge member 19 and a plurality of bolts (tightening members) 27 which tighten the first pushing member 25 in the insertion direction of the outer wedge member 19. The first pushing member 25 is an annular member and is provided on the outer diameter side of a preload nut 17. The first pushing member 25 is provided with bolt insertion holes 25a through which the bolts 27 are inserted at a plurality of locations along a circumferential direction. Screw holes 3d into which bolts 27 are screwed are provided at a plurality of locations along the circumferential direction in parts of the housing 3 facing the first pushing members 25 at both ends in the axial direction. The first pushing member 25 is fixed to the housing 3 by inserting the bolt 27 into the screw hole 3d through each bolt insertion hole 25a and tightening the bolt 27. The outer wedge member 19 is pressed by the first pushing member 25 and inserted between the outer ring 9 and the housing 3.

The second tightening mechanism 29 includes a second pushing member 31 which is in contact with the base end of the inner wedge member 21 and a nut (tightening member) 33 which tightens the second pushing member 31 toward the insertion direction of the inner wedge member 21. The second pushing member 31 is integrally formed of an annular portion 31a in contact with the base end of the inner wedge member 21 and a pressing portion 31b extending rearward from the annular portion 31a in the insertion direction of the inner wedge member 21. The nut 33 illustrated in FIG. 2 is attached to the male screw portion 5b. Similarly, the nut 33 is attached to the male screw portion 5a illustrated in FIG. 1. The inner wedge member 21 is pressed against the second pushing member 31 by tightening the nut 33 and is inserted between the inner ring 11 and the rotating shaft 5.

According to the configuration described above, the wedge effect of the outer wedge member 19 and the inner wedge member 21 allows the outer ring 9 and the inner ring 11 of the bearing 7 to be directly and firmly fixed to the housing 3 and the rotating shaft 5 in addition to the configuration in which the normal fixed position preloading is performed. Therefore, even when the rotating shaft 5 receives a large input, the bearing 7 is less likely to be displaced.

Figure 3:
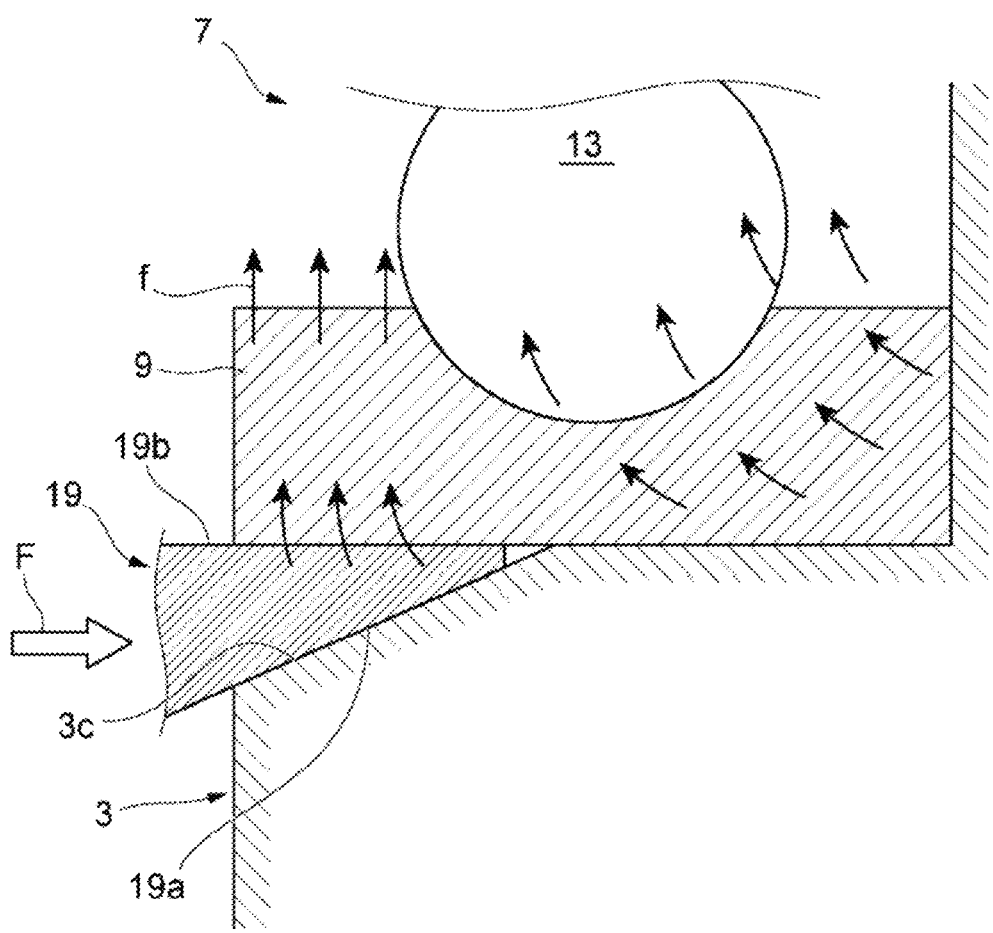
FIG. 3 is an explanatory diagram of a wedge effect.

FIG. 3 illustrates the wedge effect of the outer wedge member 19 inserted between the outer ring 9 and the housing 3. An arrow F in the drawing illustrates a pushing force applied to the outer wedge member 19 and an arrow f schematically illustrates a direction of stress in each part of the outer wedge member 19.

The outer wedge member 19 and the inner wedge member 21 can apply an appropriate preload to the bearing 7 to add rigidity by appropriately designing the position of action of the force due to the wedge effect on the bearing 7 as illustrated in FIG. 3, as similar to the fixed position preloading which applies the preload by the dimensional difference between the inner and outer spacers.

Therefore, according to the configuration, a small preload to the extent that determines the position of the rotating shaft 5 in a free state is applied by a normal fixed position preloading and a stronger preload for ensuring rigidity is applied by tightening by the wedge effect, in such a manner that it is possible to prevent changes in preload and occurrence of disconnection due to dimensional changes in the rotating shaft 5 and the housing 3 due to temperature changes.

According to the configuration, the outer ring 9 and the inner ring 11 of the bearing 7 illustrated in FIGS. 1 and 2 can be firmly fixed in the axial direction by the friction generated by the tightening force due to the wedge effect. That is, compared with the normal fixed position preload bearing assembly in which the inner ring 11 and the outer ring 9 are fixed to the rotating shaft 5 and the housing 3, fixing is possible with an extremely small tightening force by the first tightening mechanism 23 and the second tightening mechanism 29. This can make the bolt 27, which is a tightening member for the outer ring 9, small size and reduce the number of the bolt 27, ensuring high rigidity in a smaller space compared to a normal bearing assembly with the fixed position preload.

In the bearing assembly 1 having the configuration described above, arbitrary preload can be secured by the wedge effect of the outer wedge member 19 and the inner wedge member 21. That is, the rigidity of the rotating shaft 5 can be easily adjusted by adjusting the tightening force of the outer wedge member 19 and the inner wedge member 21. Since the structure does not use press fitting for fixing the inner ring 11 and the rotating shaft 5 and fixing the outer ring 9 and the housing 3, it is easy to disassemble and assemble.

Second Embodiment

Figure 4:
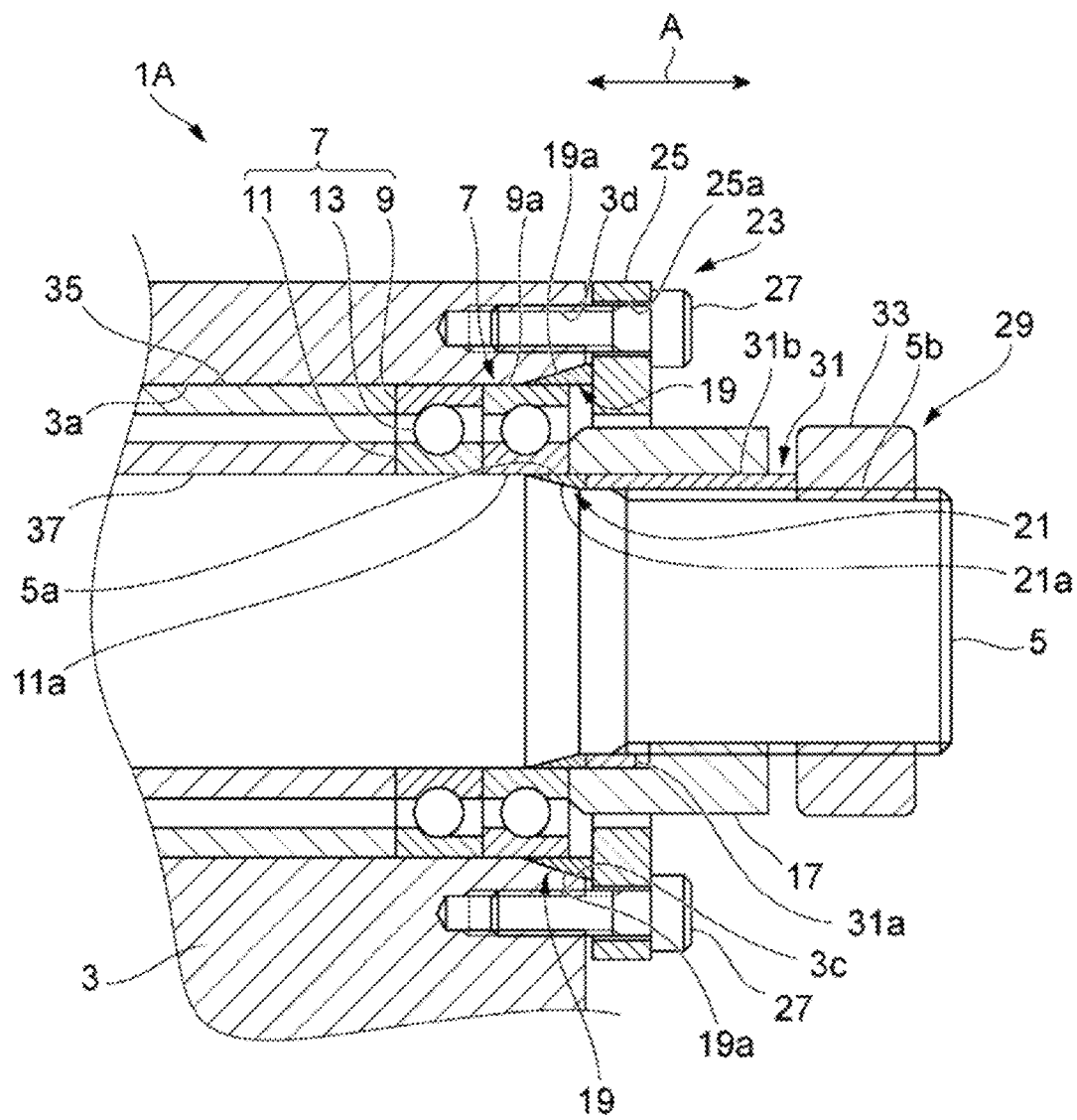
FIG. 4 is a cross-sectional view of a bearing assembly according to a second embodiment of the invention.

FIG. 4 is a cross-sectional view of a bearing assembly 1A according to a second embodiment of the invention. In the following description, components which are the same as or functionally common to the components described above will be designated by the same reference numerals and letters, and the description thereof will be omitted as appropriate.

In the bearing assembly 1A illustrated in FIG. 4, the bearings 7 are arranged in multiple rows (two rows in the example) at both ends of the housing 3 in the axial direction. An outer ring spacer 35 and an inner ring spacer 37 are provided between the pair of bearings 7 arranged inside in the axial direction. The outer ring spacer 35 is provided between the outer rings 9 of the pair of inner bearings 7 and the inner ring spacer 37 is provided between the inner rings 11 of the pair of inner bearings 7. The axial dimension of the inner ring spacer 37 is selected (formed) shorter than the axial dimension of the outer ring spacer 35 by the preload. The inner rings 11 of the pair of inner bearings 7 are fastened from both sides in the axial direction in a state where the inner ring spacer 37 is interposed therebetween by the preload nuts 17 together with the inner rings 11 of the pair of outer bearings 7. Therefore, each bearing 7 is applied the required preload.

As described above, even in the configuration in which the bearings 7 are arranged in multiple rows at both ends of the housing 3 in the axial direction, in addition to the configuration in which the normal fixed position preloading is performed, the wedge effect of the outer wedge member 19 and the inner wedge member 21 can directly and firmly fix the outer ring 9 and the inner ring 11 of the bearing 7 to the housing 3 and the rotating shaft 5. Fixing by the wedge effect is highly effective in preventing displacement in a radial direction. Therefore, by applying the fixing by the wedge effect to a part or all of the bearings 7 used in the double row, it is possible to realize the bearing assembly 1A which is easy to disassemble and maintain and has high accuracy.

Third Embodiment

Figure 5:
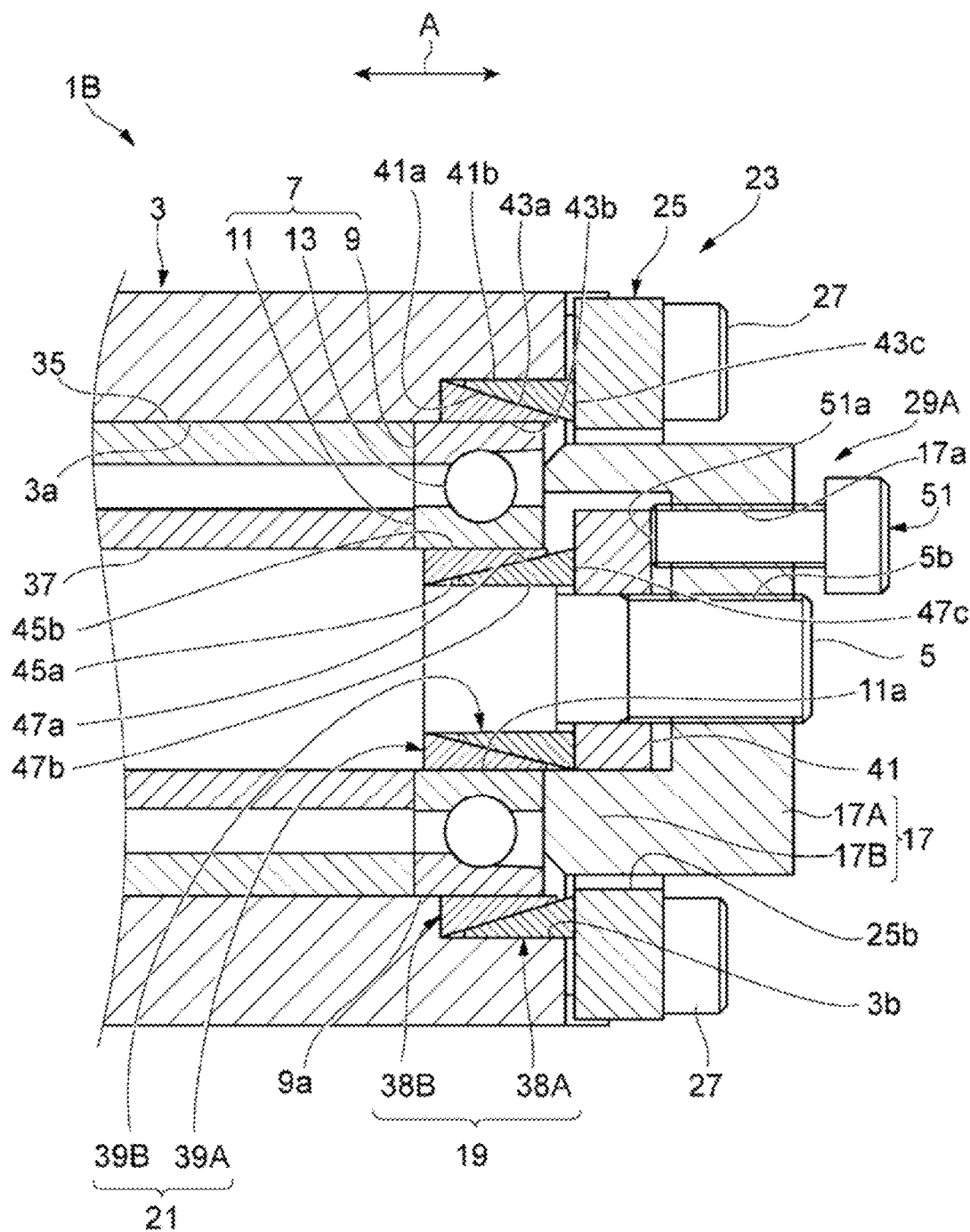
FIG. 5 is a cross-sectional view of a bearing assembly according to a third embodiment of the invention.
Figure 6:
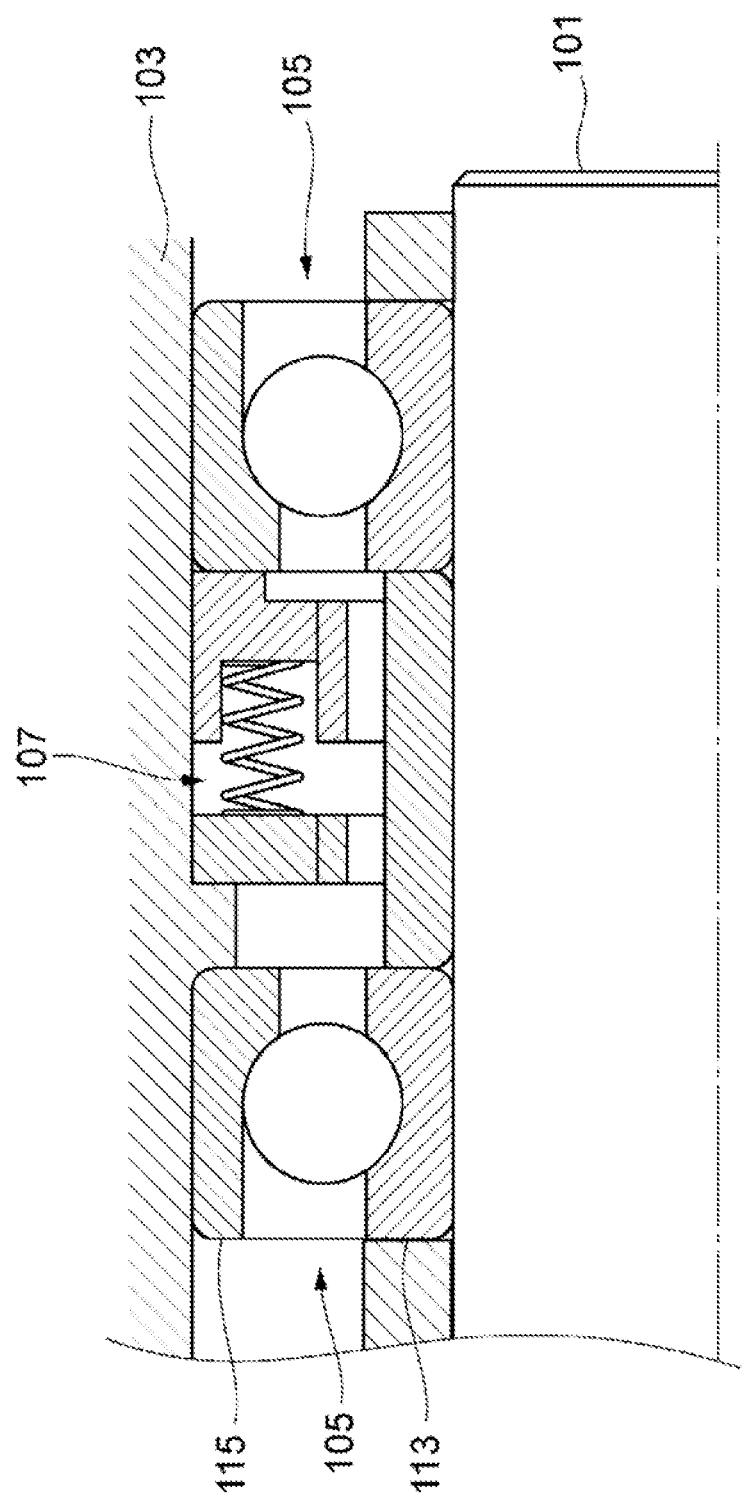
FIG. 6 is a cross-sectional view for explaining a constant pressure preloading method of the related art.
Figure 7:
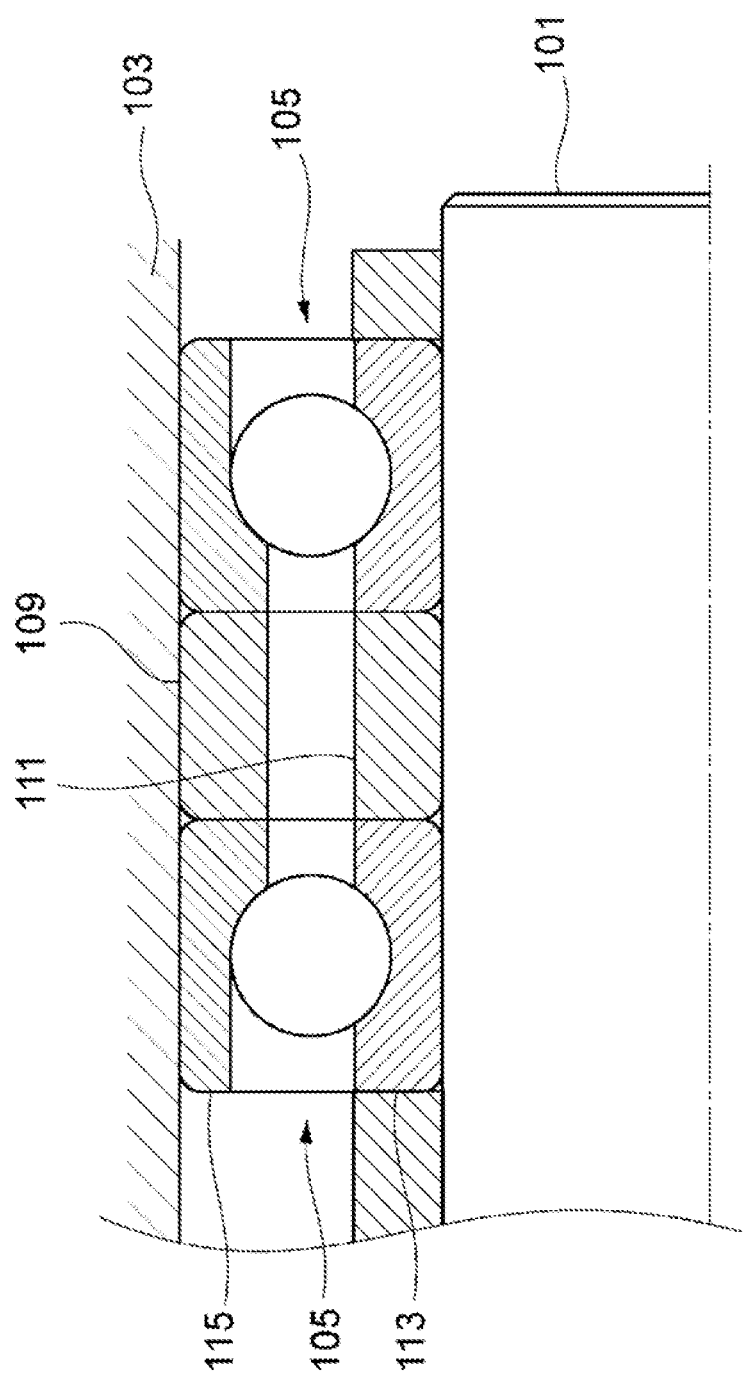
FIG. 7 is a cross-sectional view for explaining a fixed position preloading method of the related art.
Figure 8:
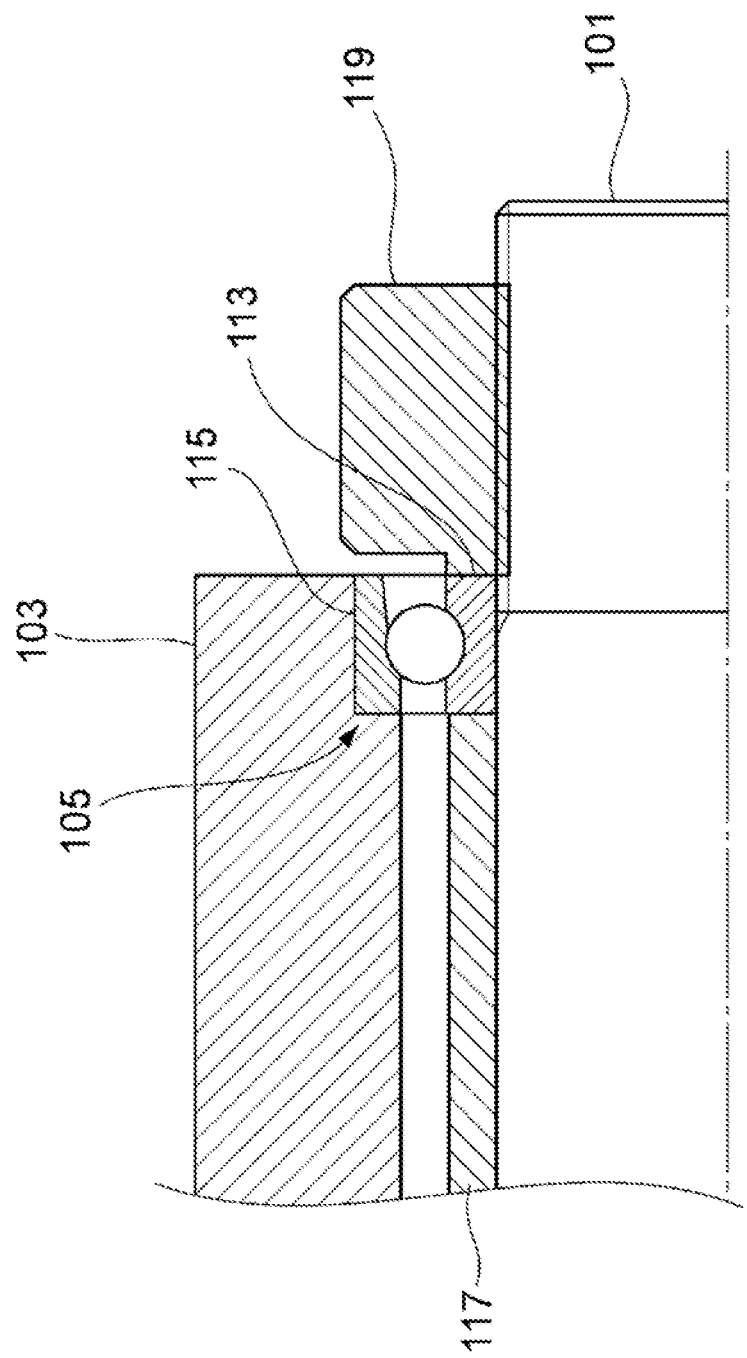
FIG. 8 is a cross-sectional view of a bearing assembly with the fixed position preloading method of the related art.
Figure 9:
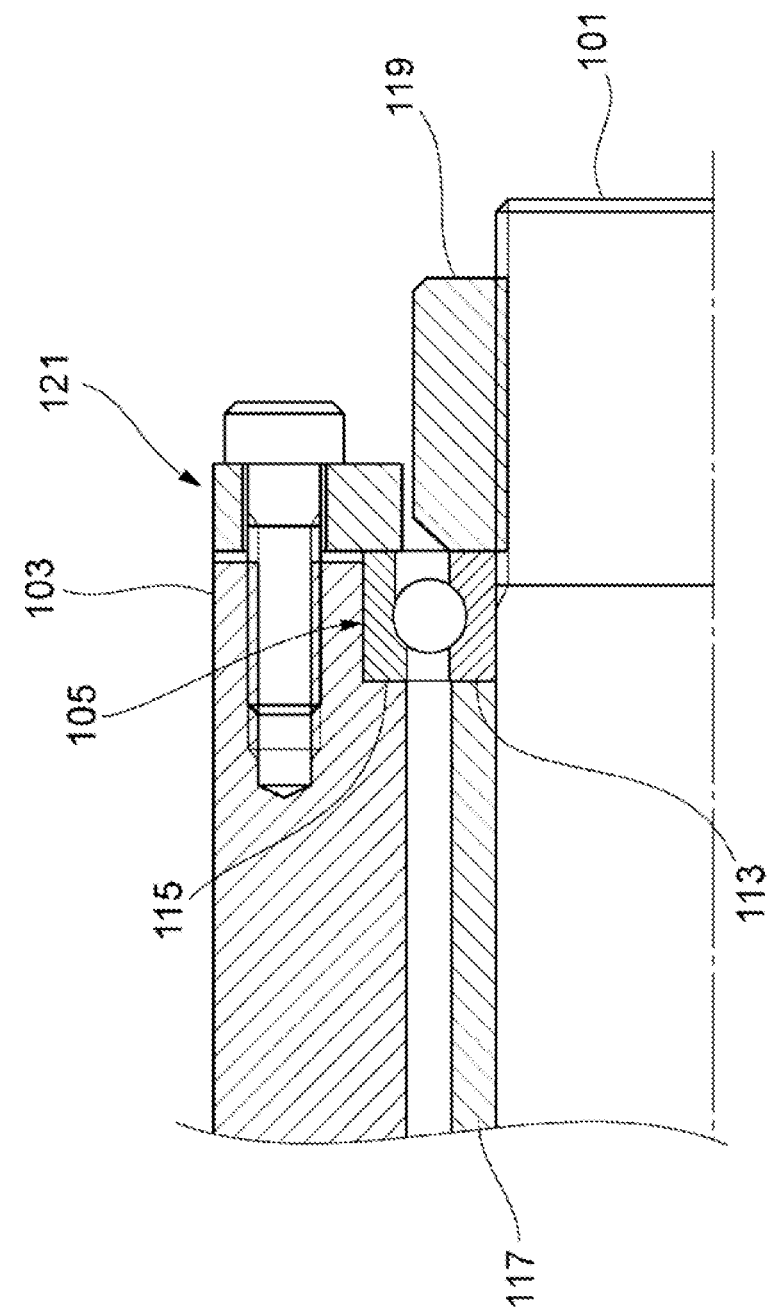
FIG. 9 is a cross-sectional view of another bearing assembly with the fixed position preloading method of the related art.

FIG. 5 is a cross-sectional view of the bearing assembly 1B according to a third embodiment of the invention.

The outer wedge member 19 of the bearing assembly 1B illustrated in FIG. 5 includes a pair of annular wedge pieces 38A and 38B and the inner wedge member 21 has a pair of annular wedge pieces 39A and 39B. The pair of wedge pieces 38A and 38B respectively have inclined engaging surfaces 41a and 43a and the pair of wedge pieces 39A and 39B respectively have inclined engaging surfaces 45a and 47a.

One wedge piece 38B of the outer wedge member 19 is fitted onto the outer peripheral surface 9a of the outer ring 9 of the bearing 7 and the other wedge piece 38A is inserted into the notch 3b formed in the housing 3, which is a mating member facing the outer ring 9 of the bearing 7.

One wedge piece 39A of the inner wedge member 21 is fitted in the inner peripheral surface 11a of the inner ring 11 of the bearing 7 and the other wedge piece 39B is inserted along the outer peripheral surface of the rotating shaft 5, which is a mating member facing the inner ring 11 of the bearing 7.

In the wedge piece 38A of the outer wedge member 19, an end surface 43c on the base end side in the insertion direction is pressed against the first pushing member 25 of the first tightening mechanism 23. The first pushing member 25 pushes the wedge piece 38A toward the housing 3 by tightening the bolt 27, as similar to the first embodiment. As a result, a radial force due to the wedge effect is generated between the inclined engaging surface 41a and the inclined engaging surface 43a, and thus the outer ring 9 of the bearing 7 can be directly and firmly fixed to the housing 3.

In the wedge piece 39B of the inner wedge member 21, a side surface 47c on the base end side in the insertion direction is pressed against the second pushing member 41 of the second tightening mechanism 29A.

The second tightening mechanism 29A includes a second pushing member 41 which is in contact with a side surface 47c of the wedge piece 39B of the inner wedge member 21 and a bolt (tightening member) 51 which tightens the second pushing member 41 toward the insertion direction of the inner wedge member 21.

The second pushing member 41 is an annular member movably mounted on the rotating shaft 5 in the axial direction and is provided in an internal space of the preload nut 17 in the example.

The preload nut 17 includes a disc-shaped base portion 17A screwed into the male screw portion 5b of the rotating shaft 5 and an abutment portion 17B erected from an outer peripheral portion of the base portion 17A. The abutment portion 17B is inserted into an opening 25b of the first pushing member 25 and fix the inner ring 11 of the bearing 7 in the axial direction by a part of the tip end side of the abutment portion 17B.

The bolt 51 is attached to a bolt hole 17a which axially penetrates the preload nut 17 and a bolt tip 51a abuts on the second pushing member 41. Then, when the bolt 51 is tightened, the second pushing member 41 presses the inner wedge piece 39B in the axial direction, and thus a radial force due to the wedge effect is generated between the inclined engaging surface 47a of the wedge piece 39B and the inclined engaging surface 45a of the wedge piece 39A. As a result, the inner ring 11 of the bearing 7 can be directly and firmly fixed to the rotating shaft 5.

Although not illustrated, a plurality of bolts 51 are provided and each bolt 51 causes the second pushing member 41 to evenly press the wedge piece 39B.

According to the configuration described above, each of the outer wedge member 19 and the inner wedge member 21 exerts the wedge effect. Therefore, it is not necessary to provide the inclined inner peripheral surface 3c (see FIGS. 1 and 2) in the housing 3 and it is not necessary to provide the inclined outer peripheral surface 5c (see FIGS. 1 and 2) in the rotating shaft 5. Therefore, it is not necessary to separately process the housing 3 and the rotating shaft 5 to obtain the wedge effect, so that a bearing assembly 1B can be realized at a relatively low cost.

In each of the embodiments described above, the outer wedge member 19 is provided between the outer ring 9 and the housing 3 and the inner wedge member 21 is provided between the inner ring 11 and the rotating shaft 5, in such a manner that the outer ring 9 and the inner ring 11 are respectively fixed to the housing 3 and the rotating shaft 5 by the wedge effect. However, only one of the outer wedge member 19 and the inner wedge member 21 described above may be provided.

As described above, the invention is not limited to the embodiment described above. It is also planned to combine the configurations of the embodiments with each other, to be modified and applied by those skilled in the art based on the description of the specification and well-known techniques, and those are included in the scope of seeking protection.

The bearing preloading method described above can also be applied to various machines (including machines in which the power of an instrument or the like is manual) equipped with bearings. For example, the bearing preloading method can be applied to rotary supports of linear motion devices such as screw shafts, ball screw devices such as nuts, screw devices, devices which combine linear motion guide bearings and ball screws, and actuators such as XY tables.

The bearing preloading method can also be applied to the rotation support of steering devices such as steering columns, universal joints, intermediate gears, rack and pinions, electric power steering devices, worm reducers, and torque sensors.

The bearing preloading method can be widely applied to the above machines, vehicles including steering devices, machine tools, housing equipment, and the likes.

According to the machines, vehicles, and the likes obtained by the invention, it is possible to obtain a high-quality configuration with higher rigidity, smaller size, improved maintainability, creep resistance, and stability of temperature changes than before.

The invention claimed is:

1. A method for preloading a pair of rolling bearings of a housing which supports a rotating shaft via the pair of rolling bearings which are subjected to fixed position preloading, the method comprising:
   restricting an axial distance between outer rings of the pair of rolling bearings by a housing portion or an outer ring spacer which is provided between the outer rings;
   restricting an axial distance between inner rings of the pair of rolling bearings by an inner ring spacer which is provided between the inner rings and has a shorter axial dimension than the housing portion or the outer ring spacer;
   tightening the inner rings from both sides in the axial direction by preload nuts in a state where the inner ring spacer is interposed therebetween, whereby applying a fixed position preload to the pair of bearings;
   inserting first and second wedge members, whose radial thickness gradually increases from a tip end portion to a base end portion, from the tip end portion of the wedge members along an axial direction of the rotating shaft into at least one of between an outer peripheral surface of the outer rings of the pair of rolling bearings and the housing and between an inner peripheral surface of the inner rings of the pair of rolling bearings and the rotating shaft, respectively; and
   applying a preload to the pair of rolling bearings together with the fixed position preload by tightening and fixing the first and second wedge members in an insertion direction by respective tightening members.

2. The method according to claim 1, further comprising:
   inserting the first and second wedge members along an inclined inner peripheral surface formed in a region of the housing facing the outer peripheral surface of the outer rings, respectively.

3. The method according to claim 1, further comprising:
   inserting the first and second wedge members along an inclined outer peripheral surface formed in a region of the rotating shaft facing the inner peripheral surface of the inner rings, respectively.

4. The method according to claim 1, wherein
   each of the first and second wedge member is an annular member in which an inclined surface inclined from the insertion direction of each said wedge member is formed along a circumferential direction.

5. The method according to claim 1, wherein the preload applied by the first and second wedge members is greater than the fixed position preload.

6. A method for preloading a pair of rolling bearings of a housing which supports a rotating shaft via the pair of rolling bearings which are subjected to fixed position preloading, the method comprising:
   restricting an axial distance between outer rings of the pair of rolling bearings by a housing portion or an outer ring spacer which is provided between the outer rings;
   restricting an axial distance between inner rings of the pair of rolling bearings by an inner ring spacer which is provided between the inner rings and has a shorter axial dimension than the housing portion or the outer ring spacer;
   tightening the inner rings from both sides in the axial direction by preload nuts in a state where the inner ring spacer is interposed therebetween, whereby applying a fixed position preload to the pair of bearings;
   arranging a first and second wedge members, each including a pair of wedge pieces into at least one of between an outer peripheral surface of the outer rings of the plurality of rolling bearings and the housing and between an inner peripheral surface of the inner rings of the plurality of rolling bearings and the rotating shaft, respectively, each of the pair of wedge pieces being provided with an inclined engaging surface inclined from an insertion direction and gradually increasing in radial thickness from a tip end portion to a base end portion;
   inserting one of the pair of wedge pieces from the tip end portion along an axial direction of the rotating shaft, making the one abut on the pair of rolling bearings at a peripheral surface opposite from the inclined engaging surface, and making another of the pair of wedge pieces abut on a mating member facing the pair of rolling bearings at a peripheral surface opposite from the inclined engaging surface; and
   applying a preload to the pair of rolling bearings together with the fixed position preload by tightening and fixing one of the wedge pieces in the insertion direction by respective tightening members.

7. The method according to claim 6, wherein
   each of the first and second wedge members is an annular member in which an inclined surface inclined from the insertion direction of each said wedge member is formed along a circumferential direction.

8. The method according to claim 6, wherein the preload applied by first and second wedge members is greater than the fixed position preload.

9. A bearing preload device of a housing which supports a rotating shaft via a pair of rolling bearings which are subjected to fixed position preloading, the bearing preload device comprising:
   a housing portion or an outer ring spacer which is provided between outer rings of the pair of rolling bearings, the housing portion or the outer ring spacer configured to restrict an axial distance between the outer rings;
   an inner ring spacer which is provided between the inner rings, the inner ring spacer having a shorter axial dimension than the housing portion or the outer ring spacer, and the inner ring spacer configured to restrict an axial distance between inner rings of the pair of rolling bearings;
   preload nuts configured to tighten the inner rings from both sides in the axial direction in a state where the inner ring spacer is interposed therebetween, whereby applying a fixed position preload to the pair of bearings;
   first and second wedge members inserted along an axial direction of the rotating shaft into at least one of between an outer peripheral surface of the outer rings of the plurality of rolling bearings and the housing and between an inner peripheral surface of the inner rings of the plurality of rolling bearings, respectively, and the rotating shaft and gradually increasing in radial thickness from a tip end portion to a base end portion; and respective tightening members configured to apply a preload to the plurality of rolling bearings together with the fixed position preload by tightening and fixing the wedge members in an insertion direction.

10. The bearing preload device according to claim 9, wherein the first and second wedge members are inserted along an inclined inner peripheral surface formed in a region of the housing facing the outer peripheral surface of the outer rings, respectively.

11. The bearing preload device according to claim 9, wherein the first and second wedge members are inserted along an inclined outer peripheral surface formed in a region of the rotating shaft facing the inner peripheral surface of the inner rings, respectively.

12. The bearing preload device according to claim 9, wherein each of the first and second wedge members is an annular member in which an inclined surface inclined from the insertion direction of each said wedge member is formed along a circumferential direction.

13. A bearing assembly, comprising:

a plurality of rolling bearings, each rolling bearing including an inner ring and an outer ring, and a plurality of rolling elements arranged between the outer rings and the inner rings; and a bearing preload device according to claim 9.

14. A machine, comprising:

a bearing assembly according to claim 13.

15. A vehicle, comprising:

a bearing assembly according to claim 13.

16. A bearing preload device of a housing which supports a rotating shaft via a plurality of rolling bearings which are subjected to fixed position preloading, the bearing preload device comprising:

a housing portion or an outer ring spacer which is provided between outer rings of the pair of rolling bearings, the housing portion or the outer ring spacer configured to restrict an axial distance between the outer rings;

an inner ring spacer which is provided between the inner rings, the inner ring spacer having a shorter axial dimension than the housing portion or the outer ring spacer, and the inner ring spacer configured to restrict an axial distance between inner rings of the pair of rolling bearings;

preload nuts configured to tighten the inner rings from both sides in the axial direction in a state where the inner ring spacer is interposed therebetween, whereby applying a fixed position preload to the pair of bearings;

first and second wedge members inserted into at least one of between an outer peripheral surface of the outer rings of the plurality of rolling bearings and the housing and between an inner peripheral surface of the inner rings of the plurality of rolling bearings and the rotating shaft, respectively, and each of the first and second wedge members including a pair of wedge pieces, each of the pair of wedge pieces being provided with an inclined engaging surface inclined from an insertion direction gradually increasing in radial thickness from a tip end portion to a base end portion; and respective tightening members configured to apply a preload to the plurality of rolling bearings together with the fixed position preload by tightening and fixing one of the pair of wedge pieces of each of the first and second wedge members in the insertion direction, making the one of the pair of wedge pieces abut on the plurality of rolling bearings at a peripheral surface opposite from the inclined engaging surface, and making another of the pair of wedge pieces abut on a mating member facing the plurality of rolling bearings at a peripheral surface opposite from the inclined engaging surface.

17. The bearing preload device according to claim 16, wherein each of the first and second wedge members is an annular member in which an inclined surface inclined from the insertion direction of each said wedge member is formed along a circumferential direction.

18. A bearing assembly, comprising:

a plurality of rolling bearings, each rolling bearing including an inner ring and an outer ring, and a plurality of rolling elements arranged between the outer rings and the inner rings; and a bearing preload device according to claim 16.

19. A machine, comprising:

a bearing assembly according to claim 18.

20. A vehicle, comprising:

a bearing assembly according to claim 18.

* * * * *